United States Patent [19]

Taguchi et al.

[11] Patent Number: 5,359,470
[45] Date of Patent: Oct. 25, 1994

[54] MAGNETIC RECORDING/REPRODUCING APPARATUS

[75] Inventors: Keiichi Taguchi; Satoshi Goto; Masaharu Yanaga; Yoshihiro Fujimoto; Keiichi Yanagiya, all of Kanagawa, Japan

[73] Assignee: Sony Corporation, Tokyo, Japan

[21] Appl. No.: 901,939

[22] Filed: Jun. 22, 1992

[30] Foreign Application Priority Data

Jun. 24, 1991 [JP] Japan ................................. 3-178754
Jun. 24, 1991 [JP] Japan ................................. 3-178756

[51] Int. Cl.⁵ .......................... G11B 5/03; G11B 5/02
[52] U.S. Cl. ........................................ 360/57; 360/666
[58] Field of Search ................. 360/57, 61, 62, 66, 360/46, 64, 36, 113

[56] References Cited

U.S. PATENT DOCUMENTS

| | | | |
|---|---|---|---|
| 4,471,403 | 9/1984 | Dress, Jr. et al. | 360/119 |
| 4,651,235 | 3/1987 | Morita et al. | 360/46 |
| 4,821,127 | 4/1989 | Soga et al. | 360/61 |
| 4,866,546 | 9/1989 | Nakagawa et al. | 360/61 |
| 4,956,788 | 9/1990 | Hayata et al. | 360/66 |
| 4,970,621 | 11/1990 | Gailbreath et al. | 360/66 X |
| 5,038,230 | 8/1991 | Kusunoki et al. | 360/46 |
| 5,168,395 | 12/1992 | Klaassen et al. | 360/46 |
| 5,214,545 | 5/1993 | Maeda | 360/57 |

FOREIGN PATENT DOCUMENTS

| | | |
|---|---|---|
| 0357889A3 | 3/1990 | European Pat. Off. |
| 039906 | 7/1966 | Japan . |
| 2064903 | 5/1990 | Japan . |

Primary Examiner—John Shepperd
Assistant Examiner—Le Thien Minh
Attorney, Agent, or Firm—Limbach & Limbach; Philip M. Shaw, Jr.

[57] ABSTRACT

In a magnetic recording/reproducing apparatus data is recorded in by an erase magnetic head, thereby surely extracting a regenerative clock at the reproducing time so that the operation of a regenerative clock system can be stabilized.

3 Claims, 3 Drawing Sheets

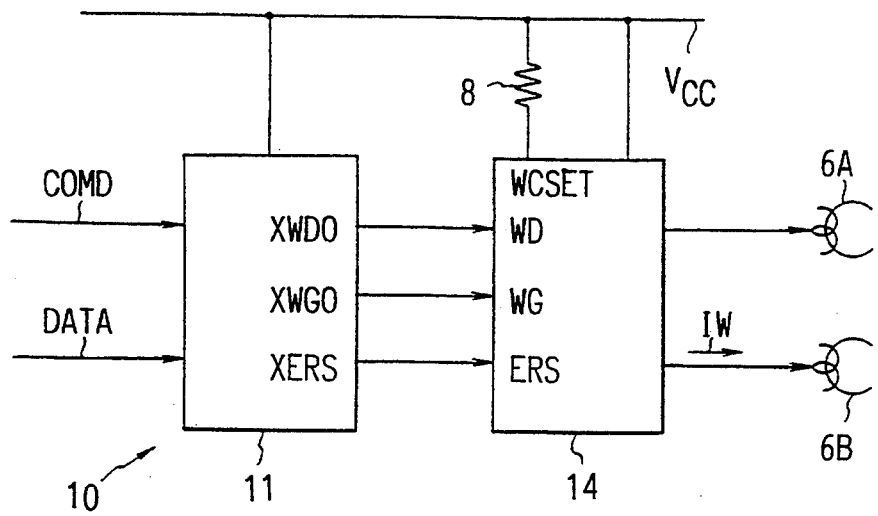
FIG. 3
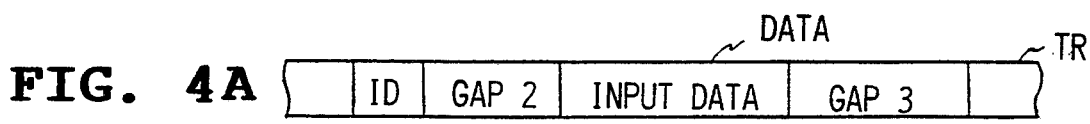
FIG. 4A
FIG. 4B
FIG. 4C
FIG. 4D
FIG. 4E
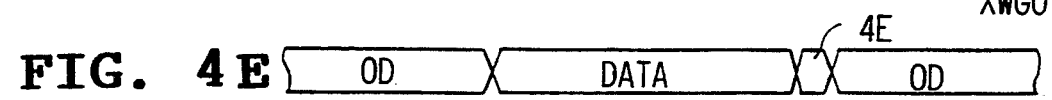
FIG. 4F
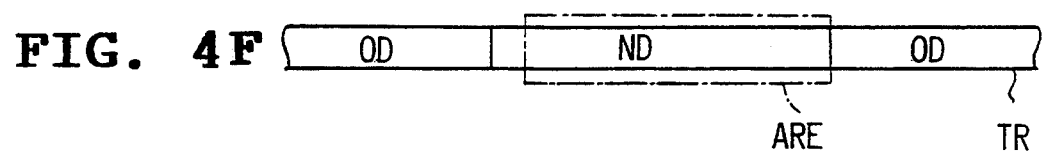

MAGNETIC RECORDING/REPRODUCING APPARATUS

BACKGROUND OF THE INVENTION

This invention relates to a magnetic recording/reproducing apparatus, and is more particularly suitable to apply to a floppy disc device for example.

Hitherto, in this type of floppy disc device, the desired data are recordable and reproducible by use of an integrated control circuit 2 and a write/read circuit 4 as illustrated in FIG. 1.

To be specific, in a floppy disc device 1, a control command COMD is inputted to the control circuit 2 from, e.g., a computer, and, at the same time, input data DATA are also inputted thereto.

The control circuit 2 changes over an operation mode of the floppy disk device 1 in conformity with the control command COMD and drives mechanical drive circuit (unillustrated) according to the necessity.

At this time, in the recording mode, the control circuit 2 causes a fall in the level of an erase control signal XERS and outputs it to the write/read circuit 4, thereby driving an erase magnetic head 6A for a predetermined period.

Further, the control circuit 2 simultaneously causes a fall in the level of a write control signal XWGO to set the write/read circuit 4 in the recording mode. Thereafter, the control circuit 2 sequentially outputs predetermined record data XWDO.

Corresponding to this operation, the write/read circuit 4 supplies, when the erase control signal XERS has fallen, a predetermined DC current to the erase magnetic head 6A.

The erase magnetic head 6A is herein constructed integrally with a recording/reproducing magnetic head 6B. The erase magnetic head 6A is arranged to scan a floppy disc in advance of the recording/reproducing magnetic head 6B, thereby erasing the recorded data beforehand with respect to an area scanned by the erasemagnetic head 6A during a falling period of the erase control signal XERS.

Further, the write/read circuit 4 drives, when being set in the recording mode, the recording/reproducing magnetic head 6B by a record current IW determined by an externally attached record current setting resistor 8 in accordance with the record data XWDO sequentially inputted.

In the floppy disc device 1, the input data DATA are sequentially thereby recordable in a predetermined format.

Namely, as illustrated in FIGS. 2A to 2D, in the floppy disc device 1, the input data are recorded on respective recording tracks TR (FIG. 2A) in sector units. At this time, predetermined gaps 2 and 3 are formed in front of and behind the respective input data.

When recording new data on a floppy disc upon which data have already been recorded, i.e. when rewriting data, erase the current to erase magnetic head 6A rises in a portion of the area of the gap 2, and simultaneously the recording/reproducing magnetic head current is increased in a portion of the area of the gap 2, by the falling of write control command WEN (FIG. 2B).

With this operation, in the floppy disk device 1, after the recording/reproducing magnetic head 6B has sequentially recorded the input data DATA in the area erased by the erase magnetic head 6A, the recording operation stops in an area of the gap 3 (FIG. 2C). New input data (indicated by a symbol ND) is recorded between the previously recorded data (indicated by a symbol OD).

In the case of driving the erase head 6A and the recording/reproducing magnetic head 6B in this manner, however, the erase magnetic head 6A erases an extra data area, in which no new data are subsequently recorded by scanning the area ARE in which the erase magnetic head 6A proceeds with respect to the recording/reproducing magnetic head 6B.

Hence, it follows that the an area in which no data is recorded exists on the recording track TR. It is difficult to obtain a regenerative signal SRF from this area (FIG. 2D).

For this reason, in the floppy disc device 1, it is hard to extract a regenerative clock pulse during the period for which the recording/reproducing magnetic head 6B scans the above-mentioned area when effecting the reproduction. This presents such a problem that the operation of a regenerative system as a whole becomes unstable.

SUMMARY OF THE INVENTION

In view of the foregoing, an object of this invention is to provide a magnetic recording/reproducing apparatus capable of causing the regenerative system to stably operate.

The foregoing object and other objects of the invention have been achieved by the provision of according to the first aspect of the invention, a magnetic recording/reproducing device 10 in which a recording/reproducing magnetic head 6B scans an area ARE scanned by a preceding erase magnetic head 6A in a recording mode, a predetermined record current IW is at the same time supplied to the recording/reproducing magnetic head 6B by changing over a polarity of the record current IW in accordance with input data DATA, and the input data DATA is recorded on a predetermined recording medium through the recording/reproducing magnetic head, wherein data (4E) corresponding to data erased by the erase magnetic head 6A is recorded in the area ARE previously erased by the erase magnetic head 6A after stopping an erasing operation of the erase magnetic head 6A, and the recording mode is thus ended.

Further, according to the second aspect of the invention, the record current IW is gradually reduced substantially to a 0 level when recording the erased data (4E).

Moreover, according to the third aspect of the invention, there is provided a magnetic recording/reproducing device 10 in which a recording/reproducing magnetic head 6B scans an area ARE scanned by a preceding an erase magnetic head 6A in a recording mode, a predetermined record current IW is at the same time supplied to the recording/reproducing magnetic head 6B by changing over a polarity of the record current IW in accordance with input data DATA, and the input data DATA is recorded on a predetermined recording medium through the recording/reproducing magnetic head 6B, wherein data (4E) comparable to data erased by the erase magnetic head 6A is recorded in the area ARE erased by the erase magnetic head 6A after stopping an erasing operation of the erase magnetic head 6A, subsequently erase data DS in which the polarity is changed over at a constant cycle is recorded in a state where the record current IW is gradually falling, and the recording mode is thus ended.

Furthermore, according to the fourth aspect of the invention, there is provided a magnetic recording/reproducing device 20 for recording predetermined input data DATA on a magnetic recording medium in a recording mode, reproducing the data recorded on the recording medium in a reproducing mode and outputting the data, which comprises: a recording/reproducing magnetic head 6B; record current control circuits 12, 14, and 16 for controlling a record current IW of the magnetic head 6B; and a write circuit 4 for outputting the record current IW to the magnetic head 6B by changing over a polarity of the record current IW and thereafter outputting the record current IW to the magnetic head 6B by changing over the polarity of the record current IW in accordance with demagnetization data DS for a predetermined period in the recording mode, the record current being gradually reduced substantially to a 0 level during a period for which the demagnetization data DS are recorded with the result that the recording mode is ended.

Furthermore, according to the fifth aspect of the invention, the record current control circuit 12, 14, and 16 hold the record current to a predetermined value at the beginning of the record mode.

After stopping the erasing operation of the erase magnetic head 6A, the data (4E) comparable to the data erased by the erase magnetic head 6A is recorded in the area ARE erased by the erase magnetic head 6A, and the recording mode is ended. The regenerative signal can thus be thereby obtained also from the area which was previously erased by the erase magnetic head 6A. The operation of the regenerative system can be stabilized, correspondingly.

Further, at this time, the record current IW is gradually reduced substantially to the 0 level, whereby the S/N ratio of the regenerative signal SRF can be improved.

Besides, there are recorded not only the data (4E) erased by the erase magnetic head 6A but also the erase data DS in which the polarity is changed over at a constant cycle in a state where the record current IW is gradually reduced in the wake of the record of the data (4E). The operation of the regenerative system is thus stabilized, and the S/N ratio of the regenerative signal can be improved.

The record current IW is outputted to the magnetic head 6B by changing over the polarity of the record current IW in accordance with the input data DATA. Thereafter, the record current IW is outputted to the magnetic head 6B by changing over the polarity of the record current IW in accordance with the demagnetization data DS for a predetermined period. During a period for recording the demagnetization data DS, the record current IW is gradually reduced substantially to the 0 level, and the recording mode is ended. It is therefore possible to surely demagnetize the magnetic head 6B.

Further, at this time, upon a initiation of the recording mode, the record current IW is held to a predetermined value. Even when demagnetizing the magnetic head, the data is surely recordable from the start of recording.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3 is a block diagram illustrating a floppy disc in one embodiment of the present invention;

FIGS. 4A to 4F are diagrams, depicting signal waveforms, of assistance in explaining the operation thereof;

DETAILED DESCRIPTION OF THE INVENTION

Preferred embodiments of this invention will be described with reference to the accompanying drawings:

First Embodiment

A floppy disc device designated generally at 10 in FIG. 3 controls a write/read circuit 14 by a control circuit 11.

Figure 1:
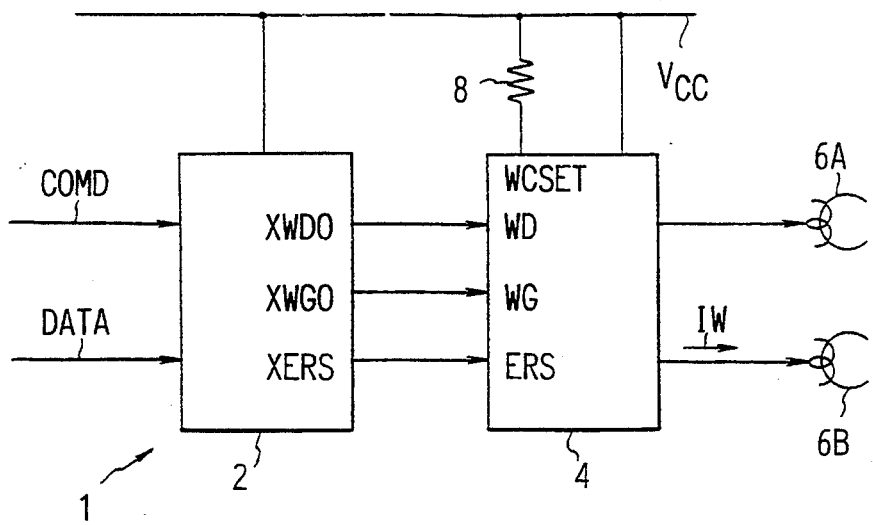
FIG. 1 is a block diagram illustrating a floppy disc of a conventional.

Namely, as illustrated in FIGS. 4A to 4F, in the control circuit 11, an erase control signal XERS (FIG. 4C) is caused to be outputted by a write control command WEN (FIG. 4B) at the same timing as the control circuit 2 (FIG. 1) to the recording tracks TR (FIG. 4A). The write/read circuit 14 is thereby controlled.

Further, the control circuit 11 causes, after causing a fall of a write gate signal XWGO (FIG. 4D) concurrently with the write control command WEN, a rise of the write control command WEN and also causes, after a predetermined period has elapsed, a rise of the write gate signal XWGO.

With this operation, in the floppy disc device 1, after stop-controlling the operation of the erase magnetic head 6A, the recording/reproducing magnetic head 6B is held in a recording state until the recording/reproducing magnetic head 6B completely scans the area previously erased by the erase magnetic head 6A.

Further, as shown in FIG. 4E the control circuit 11 outputs the input data DATA in a predetermined format during a logic low period of the write control command WEN, generates predetermined data 4E internally during a period from a logic high of the write control command WEN to a rising of the write gate signal XWGO, and outputs the data 4E generated internally following the input data DATA.

More specifically, the write/read circuit 4 internally generates the data (corresponding to input data of a value 4E in this embodiment) to be recorded in the gap 3 as the relevant data. The data concerned is thus recorded (FIG. 4E).

With this operation, in the floppy disc device 10, the data comparable to the previously erased data is recorded in a portion of the area which was erased by the preceding erase magnetic head 6A, and the generation of an unrecorded portion is effectively prevented.

Hence, in the regenerative system also, even when extracting the regenerative clock from the regenerative signal SRF, the regenerative signals can be also obtained from the area which was erased by the erase magnetic head 6A. The regenerative clock can be thereby surely obtained during operation of the floppy disc device 10.

Based on the construction given above, data recorded in the area concerned is recorded in the area erased by the preceding erase magnetic head. The regenerative signal is also thereby obtainable from the area erased by the erase magnetic head, thereby stabilizing the operation of the whole of the regenerative system.

Second Embodiment

Figure 5:
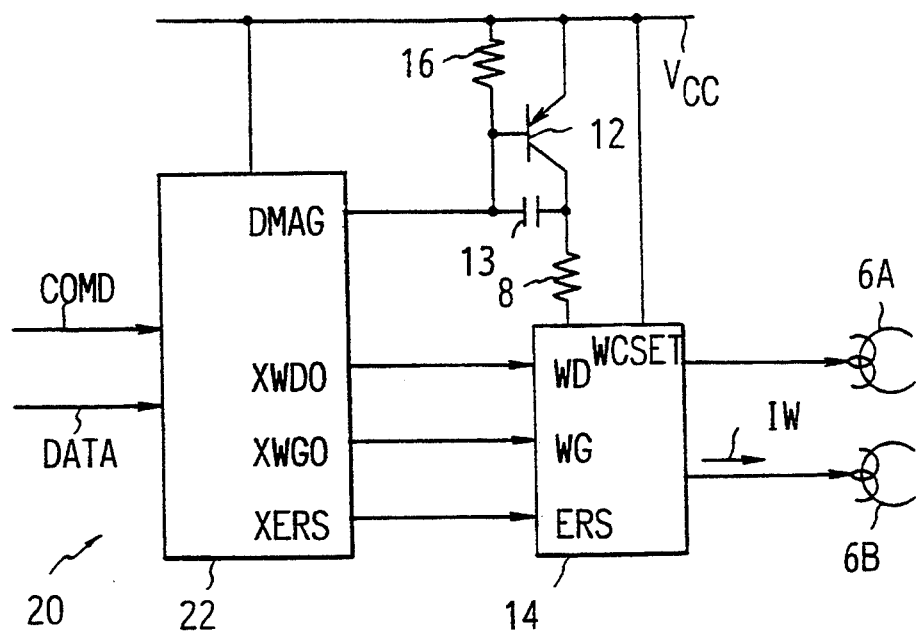
FIG. 5 is a block diagram illustrating the floppy disc device in the second embodiment thereof.

As depicted in FIG. 5, in accordance with this embodiment, a floppy disc device 20 supplies a power supply Vcc to a record current setting resistor 8 through a transistor 12.

Further, in the floppy disc device 20, a capacitor 13 is connected between a base and a collector of the transistor 12, and the power supply Vcc is supplied via a resistor 16 to the base.

With this operation, in the floppy disc device 20, a terminal voltage of the record current setting resistor 8 is reduced at a predetermined time constant in accordance with an OFF operation of the transistor 12.

Figure 2A:
FIGS. 2A to 2D are signal waveform diagrams of assistance in explaining the operation of a conventional floppy disc device.
Figure 2B:
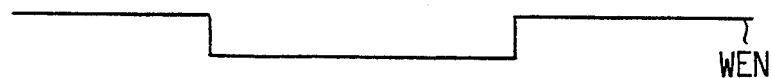
Figure 2C:
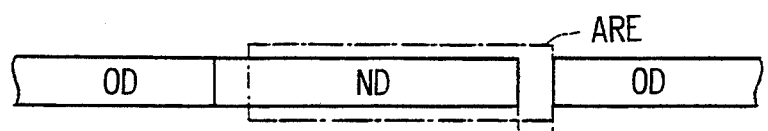
Figure 2D:
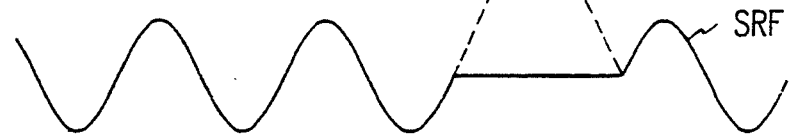

Corresponding to this, the control circuit 22 increase the signal level of a demagnetizing control signal DMAG during a period for which the recording/reproducing magnetic head 6B scans the extra erased area (e.g. the area which intrudes on the gap 3 in FIGS. 2A and 2C) which is erased by the erase magnetic head 6A.

Figure 6:
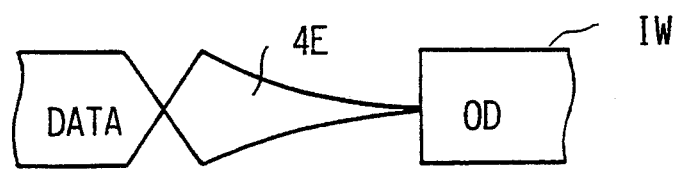
FIG. 6 is a signal waveform diagram showing record waveforms thereof.

With this operation, in the floppy disc device 20, when recording the data (indicated by 4E in FIG. 6) in the area erased by the erase magnetic head 6A, the terminal voltage of the record current setting resistor 8 is gradually reduced. The record current IW is reduced down substantially to a 0 level just before completing the scan over the relevant area.

Hence, in the floppy disc device 20, the record current IW is gradually reduced, whereby a residual magnetization of the recording/reproducing magnetic head 6B can be reduced. The recording/reproducing magnetic head 6B can be thereby demagnetized by effectively utilizing the area erased extra by the erase magnetic head 6A.

As a matter of fact, in this type of floppy disc device, when improving the recording density by decreasing the record wavelength, a S/N ratio of the regenerative signal deteriorates, correspondingly. It is difficult to correctly reproduce the data.

In this case, when demagnetizing the recording/reproducing magnetic head 6B as in this embodiment, the S/N ratio can be improved; and simultaneously a peak shift and an asymmetrical property of the regenerative signal can be also ameliorated.

Based on the construction of FIG. 5, the operation of the regenerative system is stabilized by causing the gradual fall of the record current and recording the data corresponding to the erased data in the extra erased area. Simultaneously, the S/N ratio of the regenerative signal can be improved.

Third Embodiment

Figure 7:
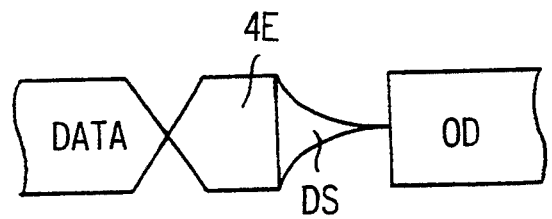
FIG. 7 is a signal waveform diagram illustrating record waveforms in a third embodiment.

As illustrated in FIG. 7, in accordance with this embodiment, the data (4E) is recorded for a predetermined period in the extra erased area Thereafter, the predetermined erase data DS is subsequently recorded.

At this time, in the write/read circuit, the record current is inverted at a clock cycle of the record data, thereby generating the data having a duty ratio of 50 [%]. The data is recorded as the record data DS on the floppy disc.

Figure 8:
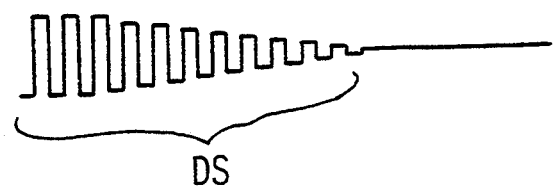
FIG. 8 is a signal waveform illustrating the demagnetization data.

Thus, in the floppy disc device, the demagnetization data having duty ratio of 50 [%] as shown in FIG. 8 is generated in this way and recorded while causing the gradual fall of the record current. The recording/reproducing magnetic head 6B can be thereby surely demagnetized. The S/N ratio of the regenerative signal can be improved, correspondingly.

Further, when completing the demagnetization while raising the signal level of the control signal DMAG during the output period of the demagnetization data DS, a capacitor 13 is charged with electricity for standing for recording of the subsequent record data. The data immediately after starting the recording can thereby be surely recorded.

With this operation, the S/N ratio of the regenerative signal can be improved without deteriorating the data just after starting the record. Besides, a peak shift of the regenerative signal and an asymmetrical property can be improved.

Other Embodiments

Note that the embodiments discussed above have dealt with the case where the magnetic head is demagnetized by use of the demagnetization data in which the signal level is inverted at the clock cycle of the record data. The present invention is not, however, limited to this case. Various data are applicable to the demagnetization data according to the necessity.

Moreover, the embodiment discussed above has dealt with the case where the present invention is applied to the floppy disc device in which the demagnetization magnetic head and the recording/reproducing magnetic head are integrally formed. The present invention is not, however, limited to this. The present invention is applicable to various floppy disc devices and further widely to a variety of recording/reproducing devices such as hard disc devices without being limited to the floppy disc devices.

As discussed above, according to the present invention, the pre-erase data is rerecorded in the area erased extra by the erase magnetic head, thereby surely extracting the regenerative clock at the reproducing time. The operation of the regenerative system can be stabilized, correspondingly.

While the invention has been described in connection with the above described preferred embodiments, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A magnetic recording/reproducing apparatus of the type in which a recording/reproducing magnetic head scans an area on a recording medium which area has been previously erased by an erase magnetic head in a recording mode, comprising:

means for supplying a predetermined record current to the recording/reproducing magnetic head and changing over a polarity of the record current in accordance with input data to thereby record the input data on all but a remaining portion of the area of the recording medium; and means for internally generating data corresponding to the data erased by the erase magnetic head and causing the recording/reproducing magnetic head to record the internally generated data in the remaining portion of the area erased by the erase magnetic head after stopping an erasing operation of the erase magnetic head, and ending the recording mode.

2. The magnetic recording/reproducing apparatus according to claim 1, wherein the record current is gradually reduced substantially to a 0 level when recording the internally generated data.

3. A magnetic recording/reproducing apparatus according to claim 1, wherein the means for internally generating data causes the recording/reproducing magnetic head to record the internally generated data as data in which the polarity is changed over at a constant cycle and with a level of the recording current being gradually reduced.

* * * * *